United States Patent [19]

Short et al.

[11] 3,725,035

[45] Apr. 3, 1973

[54] PROCESS FOR MAKING GOLD POWDER

[75] Inventors: Oliver A. Short; Richard V. Weaver, both of Wilmington, Del.

[73] Assignee: E. I. du Pont de Nemours and Company, Wilmington, Del.

[22] Filed: July 2, 1971

[21] Appl. No.: 159,486

Related U.S. Application Data

[63] Continuation-in-part of Ser. No. 15,212, Feb. 27, 1970, abandoned.

[52] U.S. Cl. ...................................... 75/.5 A, 75/118
[51] Int. Cl. .............................................. C22b 11/04
[58] Field of Search ............................... 75/.5 A, 118

[56] References Cited

UNITED STATES PATENTS

| 3,201,223 | 8/1965 | Cuhra et al. | 75/.5 A |
| 3,345,158 | 10/1967 | Block et al. | 75/.5 A |
| 3,539,114 | 11/1970 | Short | 106/290 |

*Primary Examiner*—W. W. Stallard
*Attorney*—John J. Kocko, III

[57] ABSTRACT

A process for producing precipitated gold powder comprised of gold flakes, gold spheres or mixtures thereof by reducing a gold salt solution with selected reducing agents, in the presence of a protective colloid, at an elevated temperature. The process parameters provide a means for controlling the size and shape of the precipitated gold powder which has specific applications in the decorative and/or electronics industries (i.e., metallizing compositions).

19 Claims, No Drawings

PROCESS FOR MAKING GOLD POWDER

CROSS-REFERENCE TO RELATED APPLICATIONS

This is a continuation-in-part of Ser. No. 15,212, filed Feb. 27, 1970 and now abandoned.

BACKGROUND OF THE INVENTION

Gold powders are used in a variety of commercial products, including decorative compositions, electrical conductors and resistors, etc. Each of these compositions require a gold powder having certain characteristics suitable for the particular use.

There are many chemical methods of producing gold powders and each one may include variations involving pH, dilution, and temperature, among others. A frequently used technique is to precipitate gold from chloroauric acid solution. This may be accomplished by use of active metals such as zinc, magnesium, iron, cadmium, lead, and bismuth. Also effective are inorganic reducing agents, such as ferrous sulfate, sodium sulfite, potassium sulfite, sulfur dioxide and hydrogen peroxide, or organic reducing agents, such as formic acid and formaldehyde.

The characteristics of the gold powder, such as surface area, particle size, particle shape, and tendency to adsorb oil, among others, are dependent both on the conditions of precipitation and on the particular reducing agent used. Physical characteristics such as these influence the chemical processability and determine to a large extent the appearance, usefulness, and efficiency of the gold powder in particular applications. Thus it is highly desirable to be able to control the physical characteristics of the powder by skillful manipulation of the variables of the precipitation operation.

Poor appearance, manifested by a low level of brightness, and poor fireability of gold-printed metallizing compositions, manifested by fissuring and blistering upon firing, have long been problems in the electronics industry. These problems have been found to be related to the particle shape and size of the gold powders used. The process of this invention has been discovered to control particle structure and thus provide a gold powder having a high level of brightness and good firing properties.

The conventional techniques mentioned above produce gold particles having irregular, uncontrolled size and shape, as noted, for example, in U.S. Pat. No. 3,390,981, issued July 2, 1968 to Lewis C. Hoffman. Until now, the commercially practicable preparation of gold powder particles having controlled, predictable size and shape and of the controlled mixture of flake and spherical particles has not been disclosed or published.

SUMMARY OF THE INVENTION

This invention relates to a process for producing precipitated gold powder having a controlled particle size and shape comprising reducing a gold salt solution with a reducing agent selected from the group consisting of (1) hydroquinone, and bromo, chloro, and lower alkyl substituted derivatives thereof, and mixtures thereof, (2) oxalic acid, the alkali metal salts of oxalic acid, and mixtures thereof, and (3) combinations of (1) and (2) in the presence of a protective colloid, at a temperature within the range of 20°–100°C. In addition, metallizing compositions containing these gold powders are part of the invention.

DETAILED DESCRIPTION OF THE INVENTION

According to the process of this invention an acid gold chloride solution preferably at an elevated temperature is mixed and reacted with a particular reducing agent(s) in the presence of a protective colloid to prevent the precipitated gold particles from agglomerating. It is preferred to add the gold chloride solution to the reducing agent(s) rather than vice versa. There may also be added an easily removable defoaming agent to control foaming caused by boiling and/or evolution of gaseous by-product from the decomposition of the reducing agent. The most suitable reaction temperature range is approximately 50°–100°C., and preferably approximately 85°–97°C.

A commercially practical source of gold for the precipitation reaction is a chloroauric acid solution, also known as a gold chloride or acid gold chloride solution. A suitable solution of this kind may be prepared according to well-known procedures by dissolving gold metal in aqua regia so as to produce a solution containing approximately 1–50 percent metallic gold by weight.

Of the numerous reducing agents which will precipitate gold from such solution, oxalic acid has been found to produce the flake form of gold powder having the desired size (1–50 microns across widest flat surface) when specified process ingredients and process conditions are utilized. As used herein, the term oxalic acid is meant to include water-soluble salts, such as alkali metal salts, of oxalic acid. On the other hand, hydroquinone has been found to produce spherical particles which are 0.5–2 microns in diameter. As used herein, the term hydroquinone is meant to include also substituted hydroquinones such as bromo- and chloro-hydroquinone and lower alkyl substituents such as methyl- and dimethyl-hydroquinone.

In order to produce the most desirable gold powders of this invention, it is necessary to use, as the reducing agent, hydroquinone together with oxalic acid. The utilization of this combination of reducing agents produces either (1) a gold powder containing flakes and spheres or (2) a gold powder containing spheres. The essential difference when using this combination of reducing agents lies primarily in the rate at which the gold chloride solution is added to the reducing agents. When the gold chloride solution is added rapidly, i.e., at least 500 cc./ minute, a mixture of gold flakes and spheres is produced. When the gold chloride solution is added slowly, i.e., less than 500 cc./minute, essentially only gold spheres are produced. The gold chloride solution may be added incrementally or continuously. The important requirement is that the total amount of gold chloride solution added per minute is within the limits recited above.

Concurrently, the concentration of the gold in the gold chloride solution is an important factor to be controlled in the process of this invention. As stated above, from 1–50 percent by weight of metallic gold should be present in the gold chloride solution. For example, a workable concentration contains approximately 400 grams of gold per liter of gold chloride solution, which represents about 30 weight percent gold.

The concentration of the reducing agent is not critical when each reducing agent is used alone. However, it is preferred that the total amount of reducing agent be in excess of that stoichiometrically required to react with the gold, i.e., in order to bring the reaction essentially to completion. In using oxalic acid with hydroquinone, the ratio of the oxalic acid to the hydroquinone is important. For best results the total amount of oxalic acid is approximately 5 times the amount of hydroquinone. Here also, the total quantity of reducing agent is not critical but should be in excess over the stoichiometrically required quantity in order to bring the reduction reaction essentially to completion. Preferably, the hydroquinone will be about one-fifth the stoichiometric amount required to precipitate all of the gold present while the oxalic acid will be in excess.

Although agitation is not absolutely essential to the success of the process, some agitation is desirable, as in most chemical processes, to secure good intermixing of the ingredients.

After reaction, the gold powder may be recovered from the slurry by any of the common techniques for separating particulate solids from the mother liquor. Appropriate techniques include filtration, decantation, and centrifugation. The recovered powder should be thoroughly washed with water to remove by-products salts, residual protective colloid, and defoaming agent (if used). The water wash should be followed by a thorough wash with a water-miscible organic solvent, such as methanol, to remove all water and oxidation products of the reducing agents (e.g., quinhydrone) and to facilitate drying. Drying may then be accomplished by any convenient means.

It has been found that maintenance of the particulate form of precipitate requires the use of a protective colloid to impede agglomeration of the powder particulates and to protect and separate the flakes preventing agglomeration into larger sponge-like masses. The concentration of protective colloid useful in this invention is approximately 1–15 grams/liter, and preferably 5–10 grams/liter. Of the numerous protective colloids available, gum arabic was found to be most effective. Other well known water-soluble gums and resins such as methyl cellulose, sodium alginate, gum tragacanth, gelatin, and the like were found to be moderately effective and thus within the broad scope of the invention.

The addition of even relatively small amounts of a protective colloid to the acid gold chloride solution may tend to increase the solution viscosity. Thus the evolution of gas from the oxidation of the oxalic acid may tend to cause frothing, which must be controlled. Another possible cause of bubble and froth formation is localized overheating and boiling of the reaction mixture. Any of numerous antifoam agents would be effective in controlling the froth. However, residual amounts of antifoaming agents may tend to remain adsorbed on the gold particles after washing and lead to very poor firing properties of metallizing compositions which are subsequently prepared from the gold powder. The preferred antifoam agents are therefore, those which do not remain adsorbed on the gold particles. Octyl alcohol is typical of this type antifoam agent. Of course, other similarly removable defoaming agents would also be useful; or mechanical, electrical, or ultrasonic means known to the art may be employed to break up the foam.

The invention is illustrated by the following examples. In the examples and elsewhere in the specification all parts, percentages and proportions of material or components are by weight.

EXAMPLE 1

Into one liter of water were added 5.3 grams of gum arabic, 27 grams of oxalic acid, and 2.7 grams of hydroquinone. The mixture was subjected to mild agitation and heated to approximately 97°C. Then 108 grams of gold chloride solution (containing 27 grams of gold) were rapidly poured (within a few seconds) into the reducing agent. Due to bubbling produced by the gas evolved from the oxidation of oxalic acid, octyl alcohol was added in 10-drop increments as required to control foam formation. A precipitate began to form immediately and the reaction was essentially complete in about 15 minutes; however, the mixture was retained intact for approximately 1 hour to ensure completion of the reaction. The precipitated gold powder was filtered, washed with water and methanol, and dried. Microscopic examination of the powder revealed spherical particles approximately 0.5–2 microns in diameter with randomly interspersed hexagonal and triangular flakes approximately 1–15 microns across their widest flat surface.

EXAMPLE 2

Into one liter of water were added 10 grams of gum arabic and 200 grams of oxalic acid; the mixture was subjected to mild agitation and heated to about 95°C. To this were added 10 drops of octyl alcohol to control foaming. Then 120 grams of a solution of gold chloride containing 30 grams of gold were immediately poured into the mixture. There was an induction period of about 60 seconds between the addition of the gold solution and the first appearance of a gold precipitate; however, the reaction was essentially complete after about 15 minutes as evidenced by termination of bubble evolution. The hot gold slurry was filtered through a sintered glass funnel and the precipitate was thoroughly washed on the funnel with water to remove chlorides, gum arabic and the unreacted oxalic acid. The precipitate was then washed thoroughly with methanol to remove water and was dried at room temperature. A microscopic examination of the powder showed that it was comprised of hexagonal and triangular plates 5–15 microns across the widest flat surface. There were also many small, similarly shaped particles in the range of 1–5 microns, but the greater portion was in the larger particle range.

EXAMPLE 3

Into one liter of water were added 10 grams of gum arabic and 100 grams of hydroquinone. The mixture was subjected to mild agitation and heated to approximately 85°C. To this was added 200 grams of a gold chloride solution containing 50 grams of gold. A precipitate began to form immediately and the reaction was essentially complete in about 15 minutes. The gold slurry was filtered hot, washed thoroughly with water, and then with methanol, and dried at room temperature. Microscopic examination of the powder showed it to be comprised of very uniform spherical particles about 0.5-2 microns in diameter, the greater portion being about 1 micron in diameter.

EXAMPLE 4

Into a 10 gallon glass reactor vessel 22.5 liters of water were added and heated to about 85°C. Then 160 gms. of gum arabic, 60 gms. of hydroquinone and 600 gms. of oxalic acid were added. Heating was continued with mild agitation to 97°C. When the temperature reached 97°C., heat was shut off and 1,500 ml. of chlorauric acid solution containing 600 gms. of gold were added rapidly (in about 5 sec.). Simultaneously with the addition of gold solution, 100 ml. of octyl alcohol were added. After the reaction subsided, the precipitated gold was allowed to settle. The batch was then decanted through a sintered glass filter to catch the fines, and washed successively with hot water and methanol. The gold powder was dried first at room temperature and then at 90°C. to remove methanol and any residual water.

A microscopic examination of the resulting powder showed a preponderance of 1 micron spheres of gold but with a large quantity, visually estimated at about 20 percent of 5-15 micron flakes.

EXAMPLE 5

The process of Example 4 was repeated in every detail except that the gold chloride solution was added in 250 ml. increments every 30 seconds until the 1,500 ml. had been added, requiring 3 minutes for complete addition. Microscopic examination of this powder showed that at least 98 percent of the gold was in the form of 1 micron spheres and only occasional flakes were seen.

The gold powder of this invention can be used to prepare various metallizing compositions such as are employed in printed circuits, resistors, and other electronic applications. Such metallizing composition may be readily formulated according to well-known procedures as are described in U.S. Pat. Nos. 3,413,240, 3,385,799 and 3,347,799. Of course, formulation of metallizing composition will depend upon end-use requirements. Such relevant factors as liquid vehicle composition, inorganic binder (e.g., glass frit), gold content, the kinds and amounts of other metals (e.g., platinum, palladium, silver, ruthenium), and firing conditions will be determinable by straightforward experimentation. A useful metallizing composition is described in Example 6.

EXAMPLE 6

A metallizing composition was prepared from the gold powder of Example 1. The composition contained 84 percent gold powder, 2 percent of a finely divided lead-borate glass frit composed of approximately 83 percent lead oxide and 17 percent boron trioxide, and 14 percent of a vehicle consisting of 10 percent hydrogenated rosin, 10 percent ethyl hydroxyethyl cellulose, 40 percent beta-terpineol, 20 percent kerosene and 20 percent aliphatic hydrocarbon fraction boiling higher than kerosene. This composition which was printed and fired using ordinary techniques, produced tight, bright printed lines having good electrical properties.

We claim:

1. A process for producing precipitated gold powder having a controlled particle size and shape comprising reducing a gold salt solution with a reducing agent selected from the group consisting of (1) hydroquinone, and bromo, chloro, and lower alkyl substituted derivatives thereof, and mixtures thereof, (2) oxalic acid, the alkali metal salts of oxalic acid, and mixtures thereof, and (3) combinations of (1) and (2) in the presence of a protective colloid, at a temperature within the range of 20°-100°C.

2. A process in accordance with claim 1 wherein the protective colloid is gum arabic.

3. A process in accordance with claim 1 wherein the precipitated gold powder consists essentially of gold flakes, said flakes being approximately 1-50 microns across their widest surface, wherein the gold is precipitated from an acidic gold chloride solution with a reducing agent selected from the group consisting of oxalic acid, the alkali metal salts of oxalic acid, and mixtures thereof, in the presence of a protective colloid, at a temperature within the range of 50°-100°C.

4. A process in accordance with claim 3 wherein the protective colloid is gum arabic.

5. A process in accordance with claim 3 wherein the gold flakes are approximately 1-15 microns across their widest surface and the reducing agent is oxalic acid.

6. A process in accordance with claim 1 wherein the gold powder contains relatively spherical particles approximately 0.5-2 microns in diameter, wherein the gold is precipitated from an acid gold chloride solution with reducing agent selected from the group consisting of hydroquinone, and bromo, chloro, and lower alkyl substituted derivatives thereof, and mixtures thereof, in the presence of a protective colloid, at a temperature within the range of 50°-100°C.

7. A process in accordance with claim 6 wherein the protective colloid is gum arabic.

8. A process in accordance with claim 7 wherein the temperature is approximately 85°-100°C.

9. A process in accordance with claim 1 wherein the gold powder consists essentially of a mixture of gold flakes approximately 1-50 microns across their widest surface and relatively spherical gold particles approximately 0.5-2 microns in diameter, wherein the gold is precipitated from an acid chloride solution by reaction with reducing agents comprising (a) at least one member selected from the group consisting of oxalic acid and the alkali metal salts of oxalic acid, and (b) at least one member selected from the group consisting of hydroquinone, bromo, chloro, and lower alkyl substituted derivatives thereof, in the presence of a protective colloid, at a temperature within the range of 50°-100bLC.

10. A process in accordance with claim 9 wherein the protective colloid is gum arabic.

11. A process in accordance with Claim 10 wherein the temperature is approximately 85°-100°C.

12. A process in accordance with Claim 10 wherein the gold flakes are approximately 1-15 microns across their widest surface and the reducing agent is a mixture of hydroquinone and oxalic acid.

13. A process in accordance with claim 12 wherein the ratio of oxalic acid to hydroquinone is approximately 10 to 1 on a weight basis.

14. A process in accordance with claim 9 wherein foaming and frothing are controlled by the presence of a defoaming agent.

15. A process in accordance with claim 14 wherein the defoaming agent is octyl alcohol.

16. A process in accordance with claim 1 wherein the gold powder consists essentially of relatively spherical gold particles approximately 0.5–2 microns in diameter, wherein the gold is precipitated from an acid gold chloride solution by reaction with reducing agents comprising (a) at least one member from the group consisting of oxalic acid and the alkali salts of oxalic acid, and (b) at least one member selected from the group consisting of hydroquinone, bromo, chloro, and lower alkyl substituted derivatives thereof, in the presence of a protective colloid, at a temperature within the range of 50°–100°C., said reaction being performed by slowly adding the gold chloride solution to the reducing agent.

17. A process in accordance with claim 16 wherein the gold chloride solution is added to the reducing agent at the rate of 1–500 cc. per minute.

18. A process in accordance with claim 17 wherein the gold chloride solution is added in increments over a 1-hour period.

19. A process in accordance with claim 17 wherein the gold chloride solution is added continuously.

* * * * *